INVENTORS
WILLIAM L. Mc DONALD
RAY H. THURMOND
BY Karl A. Ohralik
ATTORNEY

May 25, 1965 W. L. McDONALD ETAL 3,185,825

METHOD AND APPARATUS FOR TRANSLATING DECIMAL NUMBERS TO EQUIVALENT BINARY NUMBERS

Filed May 23, 1961 7 Sheets-Sheet 3

May 25, 1965 W. L. McDONALD ETAL 3,185,825

METHOD AND APPARATUS FOR TRANSLATING DECIMAL NUMBERS TO EQUIVALENT BINARY NUMBERS

Filed May 23, 1961 7 Sheets-Sheet 6

May 25, 1965 W. L. McDONALD ETAL 3,185,825

METHOD AND APPARATUS FOR TRANSLATING DECIMAL NUMBERS TO EQUIVALENT BINARY NUMBERS

Filed May 23, 1961 7 Sheets-Sheet 7

United States Patent Office 3,185,825

Patented May 25, 1965

3,185,825

METHOD AND APPARATUS FOR TRANSLATING DECIMAL NUMBERS TO EQUIVALENT BINARY NUMBERS

William L. McDonald and Ray H. Thurmond, Lexington, Ky., assignors to International Business Machines Corporation, New York, N.Y., a corporation of New York Filed May 23, 1961, Ser. No. 112,116
5 Claims. (Cl. 235—155)

Figure 1:
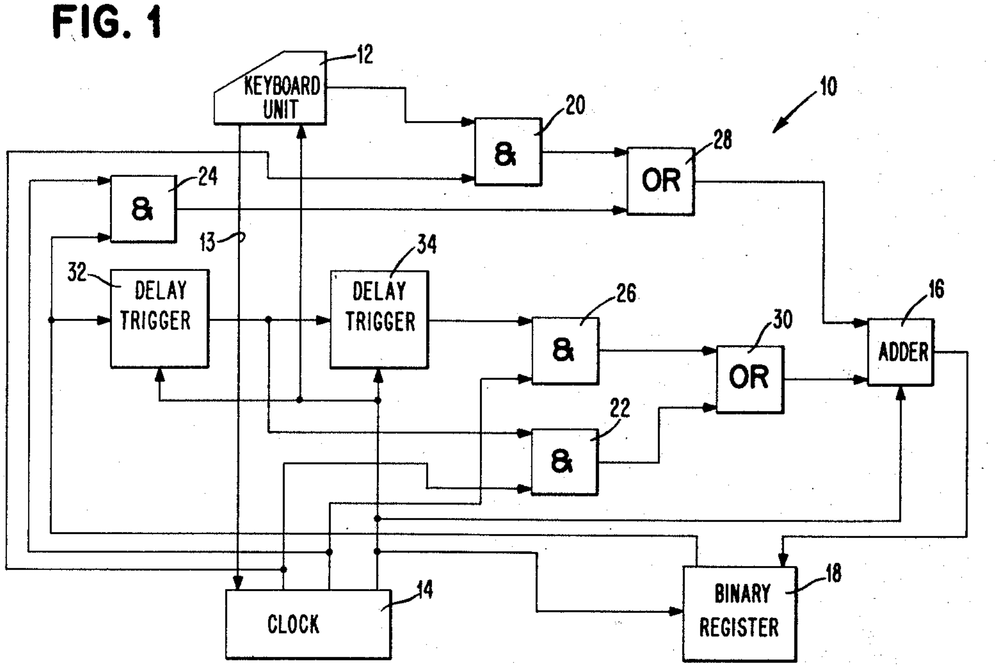

This invention relates to a method of and system for translating a decimal number to binary form and more particularly to a method and system for effecting such translation from a serial decimal input from which the decimal digits are sequentially applied.

The decimal system of numbers is by far the most familiar system to most individuals and is therefore in common use on keyboards of most office machines. In many present day computers, however, it is found most expedient for various reasons, to employ the binary systems of numbers. Thus, in cases wherein an office machine of the type having a keyboard using the decimal number system is employed in a computing system having a computer using the binary system, it becomes necessary to translate the decimal numbers entered into the keyboard into binary numbers for use in the computer.

A system for the translation of decimal numbers to binary equivalents wherein the decimal digits are serially presented is known. In accordance with such prior systems, however, the decimal digit is presented to an encoder both as the power of ten that it represents and as the weight attached to this power. That is, the power of ten that the digit represents must be known at the instant it is presented. While such a system is well adapted to certain applications, such as in systems employing keyboards wherein the positions of keys correspond to the powers of ten they represent, the system does not adapt to applications wherein a greatly simplified, ten key keyboard is employed.

Accordingly, it is a principal object of this invention to facilitate a simplified translation of a decimal number to binary form from an input presenting the decimal digits in series.

It is another object of this invention to facilitate the translation of decimal numbers to binary form wherein the decimal digits are presented serially by a ten key keyboard unit.

A number may be represented in binary form by "0's" and "1's" for the respective orders of the number, wherein "0" or "1" in the lowest order represent zero or one, respectively; in the next lowest order, represent zero or two, respectively; in the next lowest order zero or four, respectively, etc. The number "1" in the successive orders represents a number twice as great as a "1" in the next lower order. Accordingly, a shift of each digit in a binary number to the next higher order is an effective multiplication by two.

As an example, the decimal number 12 is represented in binary form as, 1100. A "1" in the third and fourth orders representing 4 and 8, respectively, establishes the number in binary form. Shifting all digits in this binary number to next higher orders results in 11000 which places a "1" in the fourth and fifth orders representing 16 and 8, respectively, so as to establish the number 24 in binary form.

In accordance with the present invention a multi-digit number in decimal form is translated to binary form by successively writing the highest order digit of the decimal number in binary form, shifting such binary number to two higher orders, adding the number so produced to the original binary number and thereafter shifting this sum one order higher. By repeating this procedure for each lower order digit of the decimal number the entire translation is effected. The effect of the two order shift is a multiplication by 4 and the addition of the original binary number to the binary number produced by the shift results in an effective multiplication of the original number by 5. A still further shift to the next higher scale order results in an effective multiplication of the number so produced, by 2 or the original binary number by ten. As an example, in writing the decimal number 24 in binary form, in accordance with this invention, the number 2 is first written in binary form as 000010. Then it is shifted two orders higher resulting in 001000, which is eight in binary form, and added to itself, resulting in 001010, which is ten in binary form. By shifting this number one order higher to yield 010100 which is twenty in binary form and adding the next decimal digit 4, the final result is 011000 which represents 24 in binary form. By repeating the described procedure for all additional digits of a decimal number, a decimal number of any number of digits may be translated to binary form within the capacity of the register utilized.

In performing the translation according to this invention a keyboard apparatus having a decimal entry is utilized. The keyboard apparatus incorporates known mechanical means effective to translate a single decimal digit to binary form. A multi-digit decimal number is entered into the keyboard by successive digits beginning with the highest order digit and proceeding with successively lower order digits. The powers of ten that each decimal digit represents need not be known as it is presented. The first decimal digit so entered is translated to binary form and applied successively in serial binary bits, low order first, to an adder, and is then applied to a binary register in which it is stored.

The subsequent entry of decimal digits into the keyboad occurs in two cycles of operation. During the first cycle, the number initially entered into the storage register is applied through two channels to the adder, one of which is through a two bit time delay and the other of which is directly from the binary register. The two bit time delay is co-ordinated with the storage writing means and thus, shifts the binary number two orders higher to effectively multiply it by four and the application of the number directly through the other channel adds it to the number so multiplied. The total effect, therefore, is a multiplication of the number originally applied to the adder, by five. This number is then entered into the binary register.

During the second cycle of operation, the number in the register at the end of the first cycle is entered into the adder through a one bit delay circuit which shifts it one order higher multiplying it by two. Thus, the initial decimal digit entered is multiplied by ten. Along with the entry of this number to the adder through the delay during the second cycle, the second decimal digit from the keyboard is entered in the adder and thus, added to the first decimal digit multiplied by ten. In like manner, the third fourth, etc., decimal digits entered into the keyboard are translated into binary form and combined with the binary number already in the register to give a true translation in binary form of the entire decimal number serially entered into the keyboard in successively descending order digits.

The foregoing and other objects, features and advantages of the invention will be apparent from the following more particular description of a preferred embodiment of the invention, as illustrated in the accompanying drawings.

Figure 2:
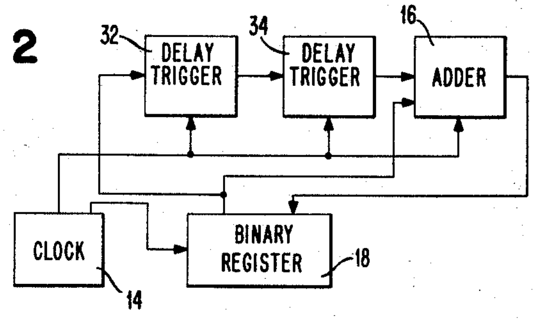
Figure 3:
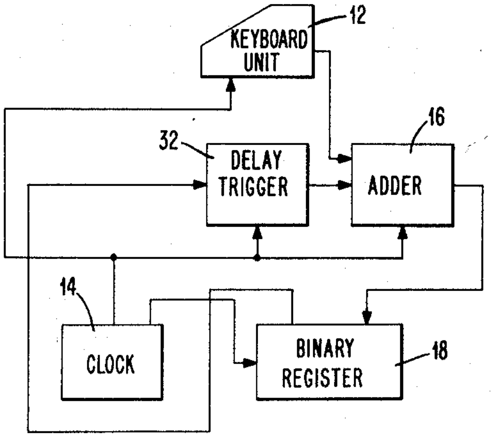
Figure 4A:
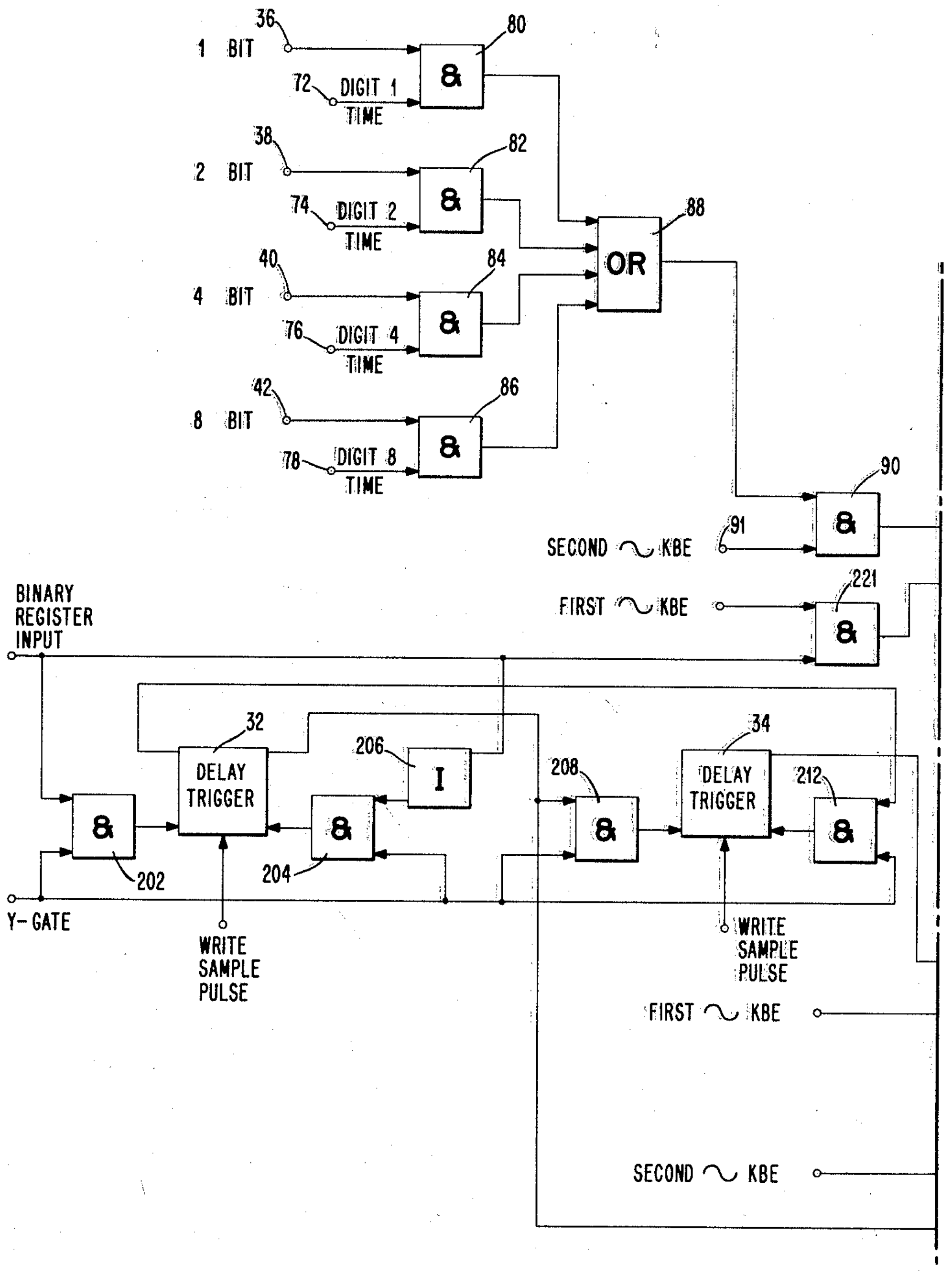
Figure 4B:
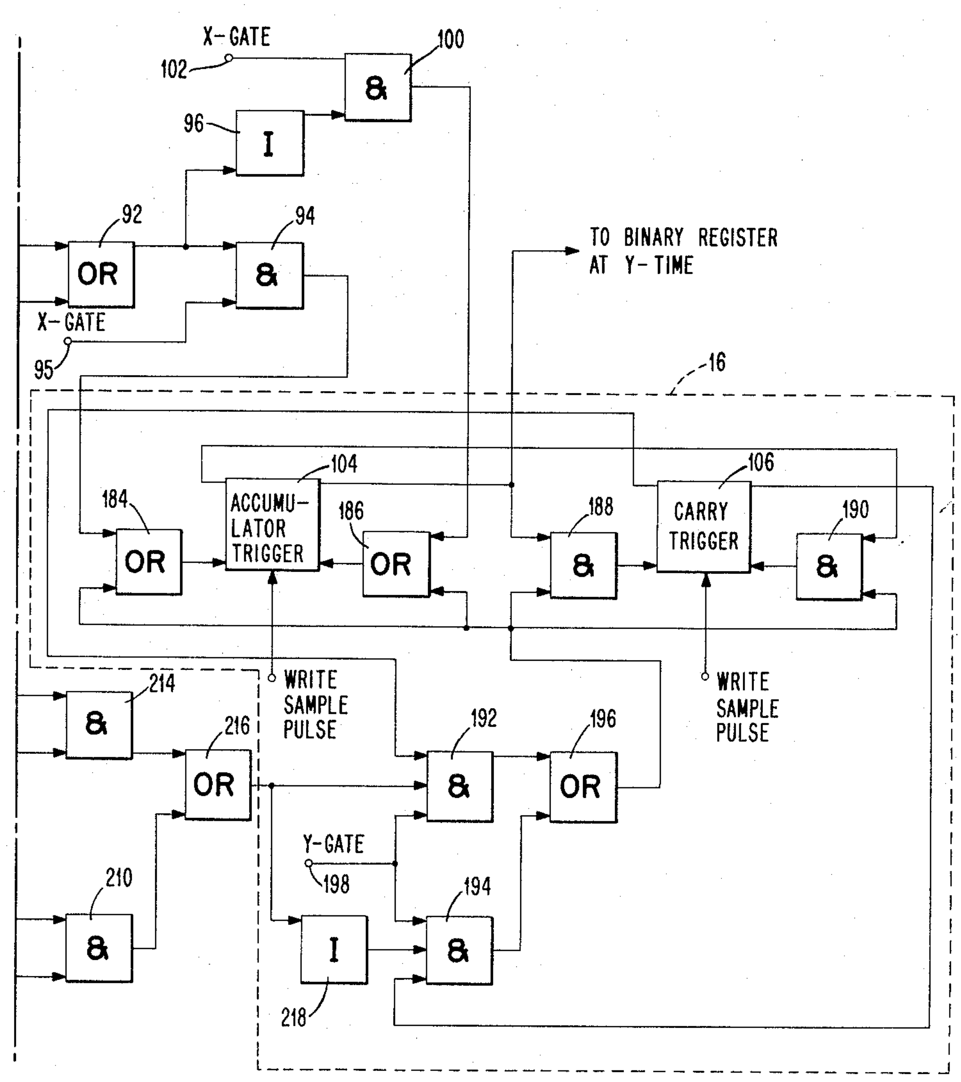
Figure 5:
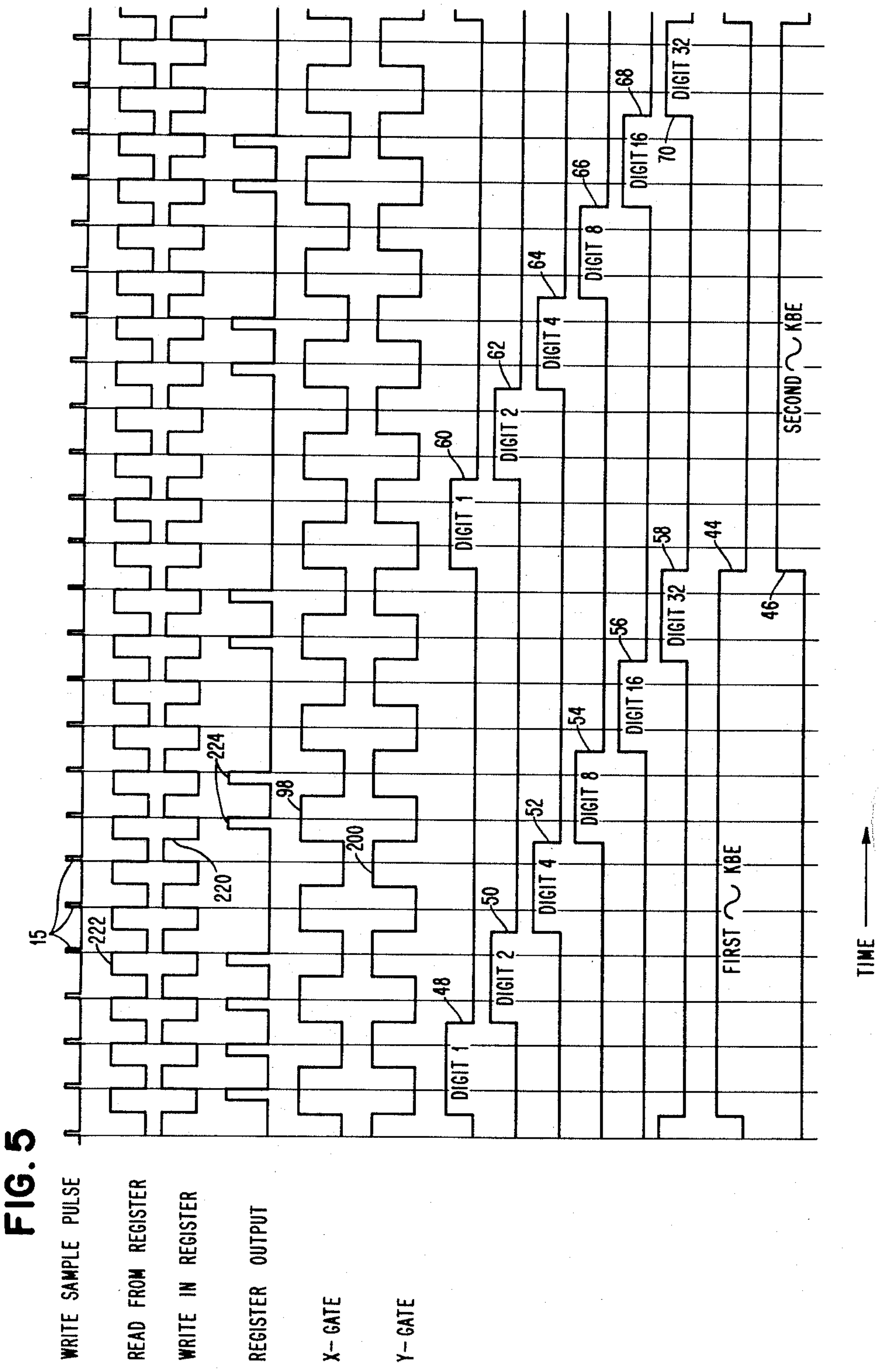

FIGURE 1 is a simplified block diagram illustrating an overall system according to the present invention, FIGURE 2 is a simplified block diagram illustrating the components of the system of FIGURE 1 which are essential and operating during the first cycle of entry of a second or subsequent decimal digit into the keyboard, FIGURE 3 is a simplified block diagram illustrating the components of the system of FIGURE 1 which are essential and operating during the second cycle of entry of a second or subsequent decimal digit into the keyboard, FIGURES 4*a* and 4*b* together show a more complete and detailed illustration of components comprising the system of the present invention, FIGURE 5 illustrates wave forms of clock pulses and signal potentials at different locations in the system of this invention, FIGURES 6, 7, 8, and 9 show details of typical AND, OR, inverter and trigger circuits, respectively, utilized in this invention.

Figure 12:
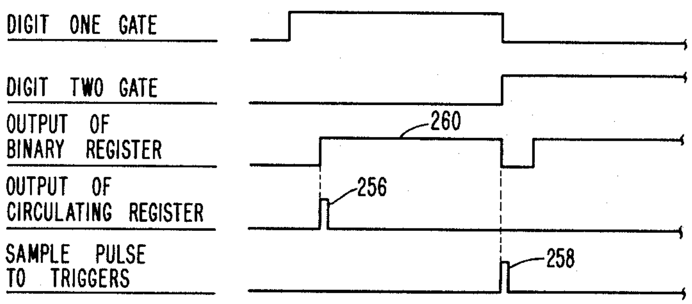
Figures 10, 11:
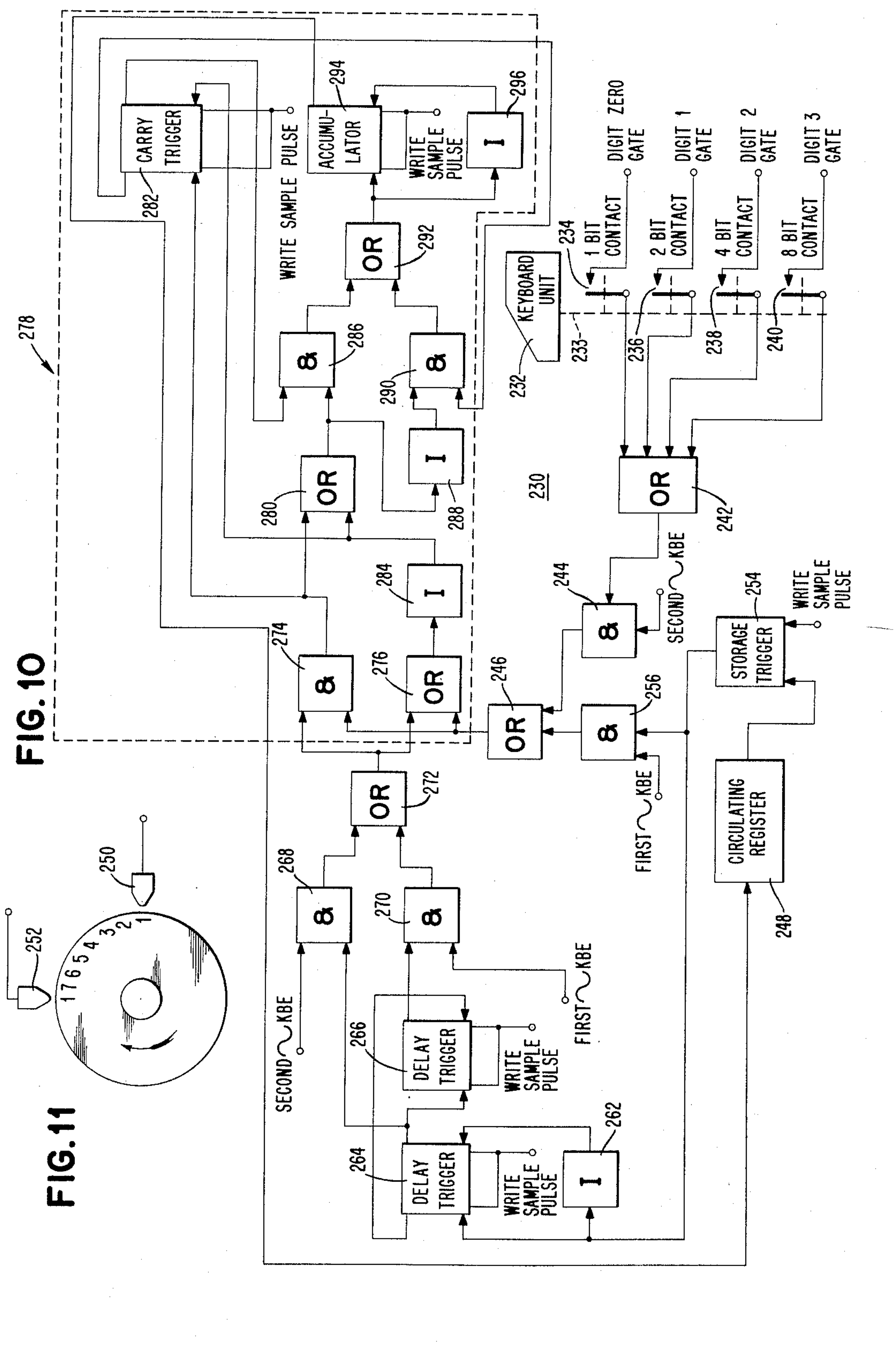

FIGURE 10 shows an alternative circuit for performing the translation according to the method of this invention, FIGURE 11 shows in detail the magnetic drum and reading and writing heads forming the circulating register of FIGURE 10, and FIGURE 12 illustrates wave forms in the system of this invention.

Referring to the drawings for a detailed description of the invention, in FIGURE 1, 10 represents an entire system of the present invention wherein the essential components thereof are shown in block form. Certain components of the system which may be conventional, such as a power supply, are not shown so as to simplify the description and explanation of this invention.

In the system 10, numeric information is entered through a keyboard unit 12 which is not shown in detail and is preferably of a conventional type having ten keys, representing the decimal digits "0" through "9," respectively, to facilitate operation thereof by anyone familiar with such keyboards. The numeric information is entered into the keyboard serially by decimal digit, highest order first and progressively lower orders thereafter whereby the units order is the last order entered.

Entry of a decimal digit into the keyboard provides a signal through line 13 and starts the operation of a clock 14 which produces and applies different potential pulses in predetermined form and timed relationship to certain components of the system 10. The pulses produced by the clock are represented graphically in FIGURE 5 of the drawings. The basic time unit of the clock is termed a "bit" time and is the period of time elapsed between alternate pulses 15. Also upon the entry of a decimal digit into the keyboard, the decimal digit is translated into binary form by a system of mechanical interposers, not shown, built into the keyboard unit and under the control of the clock. The bits of the binary number are applied serially to an adder represented generally at 16 and shown in greater detail in FIGURE 4 of the drawings. The information is then transferred from the adder to a binary register 18 for storage.

After translation of the first decimal digit and entry thereof in binary form into the register 18, the entry of each lower order digit into keyboard unit 12 takes place in two distinct cycles of operation. During each cycle AND circuits selectively receive potential pulses from the clock to establish a different circuit for performing the logic described. A pair of AND circuits 20 and 22 receive pulses from the clock during the first such cycle of operation and a pair of AND circuits 24 and 26 receive pulses from the clock during the second such cycle of operation. The AND circuits 20 and 24 each apply an output to adder 16 through an OR circuit 28 and AND circuits 22 and 26 each apply an output to the adder 16 through an OR circuit 30. The AND and OR circuits are of the type shown in detail in FIGURES 6 and 7 of the drawings.

Figure 9:
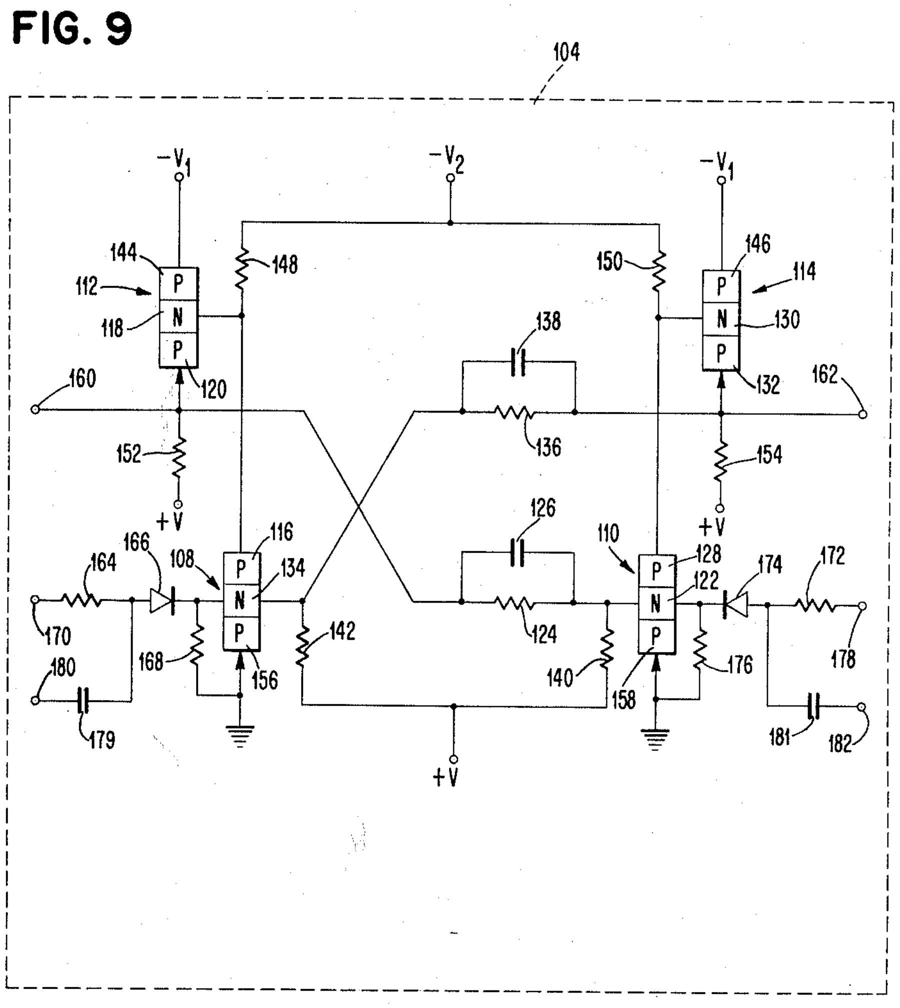

During the first such cycle of operations (1st cycle KBE), the system may be simplified to that shown in FIGURE 2 of the drawings wherein the information in the register 18 is applied both directly to the adder 16 and through a pair of digit delay trigger units 32 and 34 of the type shown in detail in FIGURE 9 of the drawings. These triggers are effectively interposed in an alternate path between register 18 and adder 16 so as to apply the numeric information in the register to the adder but delayed two bit times. During the second cycle of operation (2nd cycle KBE) the system may be simplified to that shown in FIGURE 3 of the drawings wherein the numeric information in the register is applied to the adder 16 through a single one of the delay trigger units to delay it one bit time and the newly added digit from the keyboard is entered into the adder in binary form. As explained hereinabove, this succession of operations occurring during the two cycles, is effective to enter the decimal numbers applied to the keyboard 12 into the binary register in proper binary form.

Referring to FIGURES 4*a* and 4*b* of the drawings for a more detailed description of the invention, depression of a key on keyboard unit 12 representing a decimal digit "0" through "9," through the translation effected by mechanical interposers, produces the binary equivalent at terminals 36, 38, 40 and 42 representing respective one, two, four and eight binary bits. That is, potentials are applied to a combination of the terminals 36, 38, 40 and 42 which terminals in such combination represent in binary form, the decimal digit entered. As an example, entry of decimal digit 6 into the keyboard would produce potentials at terminals 38 and 40 or in other words, the terminals representing "2" and "4." Upon the depression of the keyboard key, a signal is applied to the clock to begin its operation so as to produce the potential pulses shown in FIGURE 5 wherein the abscissa represents elapsed time and the ordinate represents potential magnitude. Zero (0) time represents the instant of depression of a key and start of the clock. For each key depression, the clock operates for a predetermined period and is then automatically interrupted. During this period it produces a first cycle keyboard entry pulse as represented by the rectangular wave 44 and a succeeding second cycle keyboard entry pulse represented by wave 46 of the same wave form and duration. During each keyboard entry cycle the clock also produces a number of digit time pulses six of which are shown and as represented by waveforms 48, 50, 52, 54, 56 and 58 occurring in immediate succession during the first cycle and each having a duration of one-sixth of the period of the pulse 44 and pulses represented by waveforms 60, 62, 64, 66, 68, and 70, occurring during the second keyboard entry cycle. The digit time pulses are applied, respectively, to terminals such as shown at 72, 74, 76, and 78. Although only four of such pulses would suffice for serially entering digits through the keyboard, in actual practice, a much larger number would be used for larger numbers occurring in the storage unit.

The pairs of terminals 36, 72; 38, 74; 40, 76; and 42, 78 are connected to respective AND circuits 80, 82, 84 and 86 and form the inputs to these circuits. Accordingly, the coincidence of potentials at both terminals of the mentioned pairs is effective to produce a potential at the output of the AND circuit to which such pair of terminals is connected. The outputs of the AND circuits 80, 82, 84 and 86 are applied to the input of an OR circuit 88. As may be understood, a potential appearing at the output of any one or more of the AND circuits 80 through 86 is effective to produce a potential at the output of OR circuit 88.

From the foregoing description it is noted that each decimal digit entered into the keyboard unit 12 produces potentials representing the binary equivalent to such digit and that such digits are sequentially sampled at digit times 1, 2, 4 and 8, respectively, and then applied as an output from OR circuit 88. This output provides an input to an AND circuit 90, another input of which is provided by the clock during the second cycle of keyboard entry at terminal 91. The potential applied at terminal 91 is represented by the rectangular wave 46. Thus, the potentials representing the binary bits are sequentially sampled during the second keyboard entry cycle. The output of AND circuit 90 is applied as an input to an OR circuit 92 the output of which, in turn, is applied to both an AND circuit 94 and in an alternate path, to an inverter circuit 96 which may be of the type shown in FIGURE 8 of the drawings. A second input to AND circuit 94 is obtained from the clock which applies to an input terminal 95 of this circuit, a series of timed pulses as shown at 98 in FIGURE 5 and herein referred to as X-gate pulses.

During X-time, the period during which the X-gate pulse appears, the presence of a potential at the output of OR circuit 92 is effective to produce an output potential at the output of AND circuit 94. This in turn is applied to the adder circuit 16.

In the alternate path, the output of the inverter 96 is applied to an AND circuit 100. A second input to AND circuit 100 is provided by the clock at X-time through another input terminal 102. The output of AND circuit 100 is also applied to the adder 16. Accordingly, during X-time, a potential is applied to the accumulator through this alternate path if there is no potential at the output of OR circuit 92 because inverter 96 produces at its output, a potential which is an inversion of the input, in the sense that the presence and absence of potentials are mutual inversions.

Figure 6:
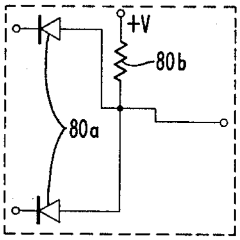
Figure 7:
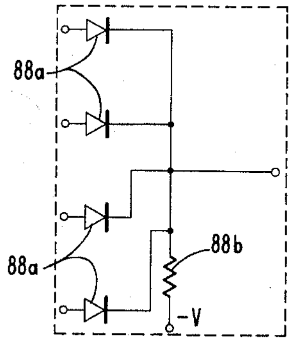
Figure 8:
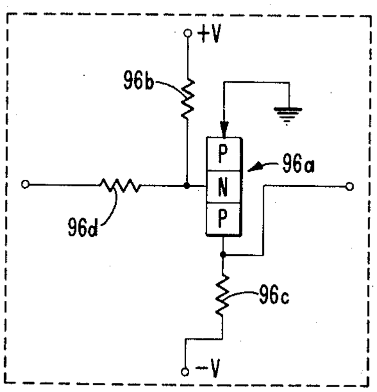

The construction of the AND, OR and inverter circuits employed in the circuit of FIGURE 4 may be as shown in FIGURES 6, 7 and 8, respectively. The AND circuit of FIGURE 6 includes a plurality of diodes 80A having their cathodes connected to respective input terminals and their anodes joined and connected to one terminal of a resistor 80B having its other terminal connected to a source of positive direct potential. An output terminal connected to the joined anode terminals is of relatively low potential if any of the input terminals are of low positive potential but if all input terminals are of high positive potential, the potential at the output terminal rises to the potential applied to the end of resistor 80B. It is to be understood that any practical number of additional inputs may be incorporated in this circuit each of which includes simply another diode with its anode joined to the others and its cathode forming the input terminal. In any case the coincidence of input potentials at all input terminals is required to produce an output potential.

The OR circuit of FIGURE 7 includes a plurality of diodes 88A having their cathodes joined and connected to one terminal of a resistor 88B and their respective anodes forming input terminals. A source of negative direct potential is applied to the other terminal of this resistor. An output terminal is connected to the cathodes. Thus, a positive potential applied to any one or more of the input terminals produces an output potential at the output terminal. It is again to be noted that such an OR circuit may have two or more inputs, depending on the number of diodes similarly applied.

The inverter circuit of FIGURE 8 includes a transistor 96A of the PNP type having its emitter grounded, its base connected to a source of positive direct potential through a resistor 96B and its collector connected to a source of negative potential through a resistor 96C. An input terminal is connected to the base through a resistor 96D and an output terminal is connected to the collector. Thus, with a negative potential applied to the input the transistor is in a state of high conduction and the output terminal is at a relatively high potential. In response to zero potential applied to the input terminal, the transistor is rendered substantially cut-off and the output terminal becomes relatively negative.

The adder circuit 16 may be any circuit capable of performing binary addition. In the present invention, it includes an accumulator trigger 104 and a carry trigger 106 of similar construction shown in detail in FIGURE 9 of the drawings. As shown in this figure, each trigger comprises a modified Eccles-Jordan type of multivibrator having a pair of transistors 108 and 110 of the PNP, junction type, with respective collectors and bases cross-coupled through emitter follower circuits including transistors 112 and 114 also of the PNP, junction type. To this end, the collector 116 of transistor 108 is directly connected to the base 118 of transistor 112 and the emitter 120 of this latter transistor is coupled to the base 122 of transistor 110 through a parallel connection of resistor 124 and capacitor 126. Similarly, the collector 128 of transistor 110 is connected to the base 130 of transistor 114 having its emitter 132 coupled to the base 134 of transistor 108 through parallel connected resistor 136 and capacitor 138. A biasing potential is applied to bases 122 and 134 from a potential source designated +V through respective resistors 140 and 142. In the emitter follower circuits, negative biasing potentials are applied to the collectors 144 and 146 from a source designated $-V_1$, to the bases 118 and 130 through respective resistors 148 and 150 from a negative source designated $-V_2$ and positive potentials to emitters 120 and 132 through respective resistors 152 and 154 from the source designated +V. The emitters 156 and 158 of transistors 108 and 110 are connected directly to ground which forms a reference potential for the positive and negative potentials described.

In the circuit of this trigger, the values of circuit elements and the applied potentials are so proportioned that two conditions of stable equilibrium exist in the trigger circuit, in each of which a different one of the transistors 108 and 110 is conducting heavily and the other one is substantially cut-off. As a concomitant condition, one of the emitter follower transistors in each case is heavily conducting and the other one is in a state of low conduction. In particular, in the stable condition wherein transistor 108 is cut-off and transistor 110 is conducting, an incident of this condition is that transistors 112 and 114 are conducting heavily and lightly, respectively. As another incident of this condition, the emitter 120 of transistor 112 is at a relatively negative potential rendering an output terminal 160 connected to this emitter, also, negative. Emitter 132 is relatively positive, rendering an output terminal 162, connected thereto, also positive. The circuit 104 is herein termed "off" when in the condition wherein transistors 108 and 114 are conducting heavily, transistor 110 is cut-off and transistor 112 is in a state of low conduction and it is termed "on" when in the alternate condition.

The condition of stability of the circuit 104 can be changed by application of a positive pulse to the base of the one of transistors 108 or 110 which is conducting. Provision for applying such pulses to transistor 108 includes a resistor 164, a diode 166 and a resistor 168 serially connected in the order named between a terminal 170 and ground and a connection between the ungrounded end of resistor 168 to base 134. Thus, potentials appearing across the resistor 168 are applied to the junction between base 134 and emitter 156 of transistor 108. Similarly, a resistor 172, a diode 174 and a resistor 176 are serially connected in the order named between a terminal 178 and ground and the ungrounded end of resistor 176 is connected to base 122 for applying potentials appearing across this resistor to the junction between base 122 and emitter 158. For proper control of the triggering pulses applied to terminals 170 and 178, a capacitor 179 is connected between a terminal 180 and the junction between resistor 164 and diode 166 and a capacitor 181 is connected between a terminal 182 and the junction between resistor 172 and diode 174. Thus, a coincidence of a sample clock pulse such as shown at 15 in FIGURE 5 of the drawings applied to either terminal 180 or 182 and a gate pulse applied to one of the terminals 170 or 178 is required for triggering action. A coincidence of such pulses applied to the conducting transistor of the pair 108 and 110, is effective to change the state of equilibrium of the circuit and render the previously conducting transistor cut-off and the previously cut-off transistor conducting. It is to be noted that application of the positive sampling pulse to the cut-off transistor is of no adverse effect and no interference with circuit operation results. It is still further to be noted that the simultaneous application of trigger pulses to bases 122 and 134 of transistors 110 and 108 together with application of a sample pulse at both terminals 180 and 182 results in a change in state of equilibrium of the circuit 104. Since appropriate pulses to terminal 170 turn the trigger "on" when it is "off" and pulses at terminal 178 turn the trigger "off" when it is "on," these respective terminals are termed "on" and "off" gate terminals, respectively.

In brief summary, in the "one" condition of circuit 104, transistors 108 and 114 are cut-off, transistors 110 and 112 are conducting, terminal 160 is negative and terminal 162 is positive. In the "off" condition of the circuit, transistors 108 and 114 are conducting, transistors 110 and 112 are cut-off, terminal 160 is positive and terminal 162 is negative. A positive gate pulse applied to terminals 170 and 178 together with a positive sample pulse applied to terminals 180 and 182, renders a conducting transistor 108 or 110, cut-off with change in state of conduction of each other transistor of the circuit.

The outputs of AND circuits 94 and 100 are applied as inputs to respective OR circuits 184 and 186, the outputs of which, in turn, are applied to terminals 170 and 178, respectively, of the accumulator trigger circuit. Thus, the accumulator may be triggered at X-time by an appropriate pulse from AND circuit 94 and clock sample pulse to turn the trigger "on" if it was previously "off" and from AND circuit 100 and clock sample pulse to turn the trigger "off" if it was previously "on."

The state of circuit 104 controls writing of numeric information into binary register 18 which has its input connected to output terminal 162 of circuit 104. This terminal also provides one of the two inputs to an AND circuit 188, the output of which is applied to the "on" gate terminal of carry trigger 106. Output terminal 160 of accumulator trigger 104 forms one of two inputs to an AND circuit 190, the output of which is applied to the "off" gate terminal of the carry trigger. The respective output terminals of carry trigger 106 form one of the inputs to the respective AND circuits 192 and 194 and the outputs of these AND circuits are applied as inputs to OR circuit 196. The output of OR circuit 196 forms the second input for each of OR circuits 184 and 186 and each of AND circuits 188 and 190.

A second input to each of AND circuits 192 and 194 is provided by the clock through a terminal 198 at Y-time, the period during which pulses 200 shown in FIGURE 5 of the drawings appear. A third input to each of these AND circuits is derived from binary storage register 18 through either delay trigger 32 or delay trigger 34 providing either a one bit time or two bit time delay as the case may be.

The "on" gate terminal of delay trigger 32 is connected to the output of an AND circuit 202 which has a pair of inputs connected respectively to the output of binary storage register 18 and to the clock 14 for receiving pulses 200 at Y-time. The "off" gate terminal of trigger 32 is connected to the output of an AND circuit 204 which has one of its two inputs connected to the clock for receiving pulses at Y-time. The other input of AND circuit 204 is connected to the output of an inverter 206 having its input connected to the output of the binary register 18. Thus, at Y-time, trigger 32 receives a pulse either at its "on" gate or "off" gate depending on the presence or absence of a pulse from the binary register or, in other words, depending on whether a "1" or "0" is read from the register.

One output terminal of delay trigger 32 is connected as one of two inputs to an AND circuit 208 and as one of two inputs to an AND circuit 210 and the other output terminal of this delay trigger is connected as one of two inputs to an AND circuit 212. The second input to each of AND circuits 208 and 212 is derived from the clock as a pulse 200 at Y-time. The outputs of AND circuits 208 and 212 are connected, respectively, to the "on" gate terminal and "off" gate terminal of the delay trigger 34. One output terminal of trigger 34 is connected as one of two inputs to an AND circuit 214. The other input to AND circuit 214 is derived from the clock as pulse 44 during the first cycle of keyboard entry and the other input to AND circuit 210 is derived from the clock as a pulse 46 during the second cycle of keyboard entry. The outputs of AND circuits 210 and 214 form the two inputs to an OR circuit 216. The third inputs to AND circuits 192 and 194 are derived from the output of OR circuit 216, directly to AND circuit 192 and through an inverter circuit 218 to AND circuit 194.

It is to be observed that the initial entry into the keyboard unit 12 is written in the binary register during the second cycle of keyboard entry. The second cycle keyboard entry clock pulse is represented by the potential pulse wave form 46 in FIGURE 5 of the drawings. During this second cycle, the numeric information is successively sampled during digit times 1, 2, 4, and 8 and applied through OR circuit 88, AND circuit 90 and OR circuit 92. If the information at any bit time is a "1," it is applied through AND circuit 94 at X-time and to the accumulator 104 through OR circuit 184 to turn "on" the accumulator if it was previously "off." If the information at the bit time mentioned is a "0," it produces a pulse through inverter 96, AND circuit 100 and OR circuit 186 to turn accumulator 104 "off" if it was previously "on." The information applied to the accumulator is then transferred to the binary storage unit 18 at the next write pulse as represented by wave form 220 in FIGURE 5 of the drawings, it being understood that a suitable clock pulse is simultaneously applied to the binary register during such writing.

In response to additional numeric information entered into the keyboard unit 12, in accordance with this invention during the first cycle of keyboard entry the information in the register is both entered directly into the accumulator and added to this information shifted two orders higher.

The information in the binary storage unit is entered directly into the accumulator through an AND circuit 221, OR circuit 92 and AND circuit 94 which has a coincident pulse applied thereto by the clock at X-time. It is also to be observed in FIGURE 5 of the drawings, that the clock produces a pair of read pulses as shown at 222 at each bit time and applies these pulses to the binary storage unit to read the information in this unit. Information in the form of "1's" produces a pair of pulses as shown at 224 at each bit time which are applied to AND circuit 202 together with Y-gate pulses as shown at 200 in FIGURE 5 of the drawings. Information in the form of "0's" produces no pulses 224. At each bit time during a Y-gate pulse as at 200 and a sample pulse applied to the trigger 32, numeric information is entered into this trigger circuit. Each "1" from the binary storage is effective through AND circuit 202 to turn trigger 32 "on" if it was previously "off" and each "0" is effective through AND circuit 204 to turn this trigger "off" if it was previously "on." The information present in trigger 32 at this pulse is transferred to delay trigger 34 through one or the other of AND circuits 208 or 212, as is appropriate and depending on whether the information is "0" or "1." At the occurrence of the very next sample pulse, the Y-gate is closed or in other words a pulse such as at 200 in FIGURE 5 of the drawings has passed. However, at the occurrence of the second sample pulse after entry of the information into trigger 32 the Y-gate is again open as may be observed in FIGURE 5 and at the coincidence of this Y-gate and the sample pulse, the information previously entered in trigger 32, is transferred to trigger 34. It should be observed that although a transfer of a "1" from the binary storage register to delay trigger 32 and a transfer of a "1" from trigger 32 to trigger 34 may occur simultaneously, the two transfers represent different bits of information. It is always the information that is in trigger 32 just prior to entry of the new information that is transferred to trigger 34. Thus, should "1" be in trigger 32 and "0" be entered from storage unit 18, the "1" is transferred from trigger 32 to trigger 34 simultaneously with such entry.

It is again noted that the duration of the sample pulse is so short that the switching action of a trigger can not occur in time or pass the newly added information in a trigger during the same sample pulse occurrence used to enter the information. Thus, during the first cycle of keyboard entry, a two bit-time delay is introduced into the information entered into the accumulator from the binary register through the trigger circuits 32 and 34. It is noted that the output terminal of OR circuit 216 is applied as one of three inputs to each of AND circuits 192 and 194 in mutually inverted form and that a second input to each of these AND circuits is derived from the clock at Y-time in the form of a Y-gate pulse as shown at 200. As to the third input to these AND circuits, it is noted that inverse potentials are applied to the two circuits from carry trigger 106. Thus, one or the other of these AND circuits is gated to apply information to the accumulator through OR circuits 196 to each of OR circuits 184 and 186 at each "1" from OR circuit 216.

During the second cycle of keyboard entry, numeric information is applied as before from the keyboard unit through the AND circuits 80, 82, 84 and 86, through OR circuit 88, AND circuit 90, OR circuit 92 and then through AND circuit 94 under control of X-gate pulses. This applies the pulses to the "on" gate of accumulator 104 through OR circuit 184. Also during the second cycle of keyboard entry, information is applied through delay trigger 32 to the accumulator and a single bit time delay is interposed in the manner as explained hereinabove. During the second cycle of keyboard entry, however, AND circuit 210 receives the information from the trigger 32 and passes this information to the accumulator through OR circuit 216, either AND circuit 192 or inverter 218 and AND circuit 194, and through OR circuit 196.

In adding two numbers from the binary register, the adder 16 operates in accordance with usual procedures for binary number addition. That is to say, the sum of "0" and "0" is "0" with "0" to carry, the sum of "0" and "1" is "1" with "0" to carry and the sum of "1" and "1" is "0" with "1" to carry. Also, the sum of "1" and "1" with "1" from carry is "1" with "1" to carry. Thus, in adding two binary numbers in the adder 16, firstly, the number in the binary register is entered into the accumulator at X-time through AND circuit 221, OR circuit 92, and either AND circuit 94 and OR circuit 184, or through inverter 96, AND circuit 100 and OR circuit 186. The accumulator may clearly be either "off" or "on" to represent either "0" or "1." Then, at Y-time the carry trigger and delay trigger are sampled so that if either one of these units but not both are registering a "1," the state of the accumulator is changed and the carry trigger is set to the state from which the accumulator just changed. If delay trigger 34 is "on" representing a "1," and carry trigger 106 is "off" representing "0," at Y-time AND circuit 192 receives a positive input from the delay trigger 34, carry trigger 106 and the clock as a Y-gate pulse. Thus, a pulse is applied from AND circuit 192 through OR circuit 196 to both OR circuits 184 and 134 to both "on" and "off" gate terminals of the accumulator. As explained hereinabove, the effect of this is to cause the accumulator to change state. If delay trigger 34 is "off" and carry trigger 106 is "on" at a Y-gate pulse, AND circuit 194 receives three positive inputs since the "0" from trigger 34 is inverted to a "1" by inverter 218 and a "1" is received from carry trigger 106. Again the output of AND circuit 194 produces input pulses to both gate terminals of the accumulator 104 to cause it to change state. However, if both trigger 34 and trigger 106 are "on" representing "1" each, through inversion in circuit 218, one of the inputs to AND circuit 194 receives a "0" and carry trigger 106 presents a "0" input to AND circuit 192 and neither of the AND circuits 192 and 194 is conditioned whereby no pulse at all is applied to the accumulator.

In response to a change of state of accumulator 104 at Y-time, carry trigger 106 is caused to assume the previous state of the accumulator. In any state of the accumulator one of its output terminals is positive and this positive potential is applied to one of the AND circuits 188 or 190. A pulse received from OR circuit 196 under the proper circumstances, applies another positive potential to these AND circuits 188 and 190 and thus, one of these AND circuits is conditioned with both inputs positive. The beginning of this pulse occurs prior to the sample pulse and the capacitor in carry trigger 106 similar to capacitors 179 or 181 in FIGURE 9 of the drawings is charged through a resistor similar to either resistor 164 or 172 prior to the occurrence of the sample pulse, accumulator trigger 104 changes state and due to the R–C time constant of the resistor capacitor 164–179 or 172–181, as the case may be, the charge on the mentioned capacitor during the sample pulse applied to the carry trigger, is sufficiently great to cause the carry trigger to assume the previous state of the accumulator. It is also to be noted that the R–C time constant at the other trigger input of the carry trigger assures a sufficiently slow build-up of potential until the sample pulse has elapsed to prevent the carry trigger from changing to the same state as the accumulator.

The translation of decimal numbers presented serially by digit, into binary numbers according to the method of this invention may be performed by the circuitry shown at 230 in FIGURE 10 of the drawings. In this circuit a keyboard unit 232 which is the same as keyboard unit 12 in FIGURE 1 of the drawings selectively actuates to close any combination of contact pairs 234, 236, 238 and 240 which correspond to the numbers 1, 2, 4, and 8, respectively. The combination of contact pairs closed represents in binary form, the decimal number entered into the keyboard. The keyboard unit includes a system of mechanical interposers of a known type for effecting such an actuation and the mechanical linkage between these interposers and the contact sets is represented by the dotted line 233. Each of the mentioned pairs of contacts is interposed in a different line which extends to a clock, not shown, but which is similar to clock 14. The clock produces a plurality of digit time pulses which are sequentially applied to the different lines in which the contact pairs are interposed. Thus, it is clear that a digit pulse is applied from any one of these lines to an OR circuit 242 if a digit pulse is applied to such line from the clock and the contact pair in such line is closed. The output of OR circuit 242 is applied as one of two inputs to an AND circuit 244, the other input being a line extending from the clock and applying a keyboard entry pulse during a second cycle of keyboard entry and being entirely similar to pulse 46 shown in FIGURE 5 of the drawings. The output of AND circuit 244 forms one of the two inputs to an OR circuit 246.

The storage unit in the circuit 230 is a magnetic drum type shown at 248. Information is written on the drum by a magnetic head as shown at 250 in FIGURE 11 of the drawings as the drum is rotated clockwise in this figure and information on the drum is read by a magnetic head 252 angularly spaced from the write head 250. As shown in FIGURE 11, the different digits of information of any "words" written on the drum occur along the circumferential portion of the drum between the heads.

The reading head 252 forms the input to a storage trigger unit 254 which may be a bi-stable unit of the type shown in FIGURE 9 of the drawings. In this case, however, terminals corresponding to terminals 170 and 178 are grounded and the input from head 252 is applied to a capacitive input terminal corresponding to terminal 180. Reset pulses are applied to the storage trigger at a terminal corresponding to terminal 182 in FIGURE 9.

As shown in FIGURE 12 of the drawings, the magnetic reading head produces a potential pulse substantially as shown at 256. The effect of this pulse is to turn trigger 254 "on" if it was "off" and a sample pulse as shown at 258 is effective to turn the trigger "off" if it was "on." An occurrence of the pulses 256 and 258 in the timed relationship shown in FIGURE 12 is effective to produce an output pulse from trigger 254 as shown at 260 in this figure. The pulse 260 is produced at a terminal corresponding to terminal 162 in FIGURE 9 of the drawings which is connected as one of two inputs to AND circuit 256, as the input to inverter 262 and to the "on" trigger terminal of a delay trigger unit 264. The delay trigger unit 264 and another delay trigger unit 266 are similar to that shown in FIGURE 9 of the dawings and are each effective to interpose a one bit time delay in the information transmitted therethrough. To accomplish this, the two outputs of trigger 264 are connected to the two inputs of trigger 266 so as to turn trigger 266 "on" as trigger 264 is "on" and to turn trigger 266 "off" as trigger 264 is "off," under the control of a sample pulse which is applied to these triggers as hereinabove described with respect to the trigger shown in FIGURE 9. One output of trigger 264 is applied as one of two inputs to an AND circuit 268 and a corresponding output of trigger 266 is applied as one of two inputs to an AND circuit 270. A second input to AND circuit 268 is derived from the clock as a second cycle keyboard entry pulse similar to that shown at 46 in FIGURE 5 of the drawings and a second input to AND circuit 270 is derived from the clock as a first cycle keyboard entry pulse similar to that shown at 44 in FIGURE 5 of the drawings. The outputs of AND circuits 268 and 270 are applied as inputs to an OR circuit 272. The output of OR circuit 272, in turn, is applied to both an AND circuit 274 and an OR circuit 276 which are units comprising part of an adder enclosed in dotted lines and designated 278. The output of AND circuit 274 is applied both as one input to an OR circuit 280 and to the "on" gate terminal of a carry trigger unit 282. The output of OR circuit 276 is applied through an inverter 284 as another input to OR circuit 280 and to the "off" gate terminal of the carry trigger. The output of OR circuit 280 is applied directly as one of a pair of inputs to an AND circuit 286 and through an inverter 288 to an AND circuit 290. The other input to AND circuit 286 is applied from one output of carry trigger 282 while the other output of this trigger is applied as the other input to AND circuit 290. An OR circuit 292 receives the outputs of circuits 286 and 290 as its input and applies its output directly to the "on" gate terminal of an accumulator trigger 294 and through an inverter 296 to the "on" gate terminal of the accumulator trigger. The carry trigger 282 and accumulator trigger 294 are entirely similar to the bi-stable circuit shown in FIGURE 9 of the drawings. The output terminal of accumulator trigger 294 is applied to the magnetic "write" head 250 for writing information on the magnetic drum 248.

In the operation of the circuit 230, numeric information is initially entered into the keyboard unit and applied through OR circuit 242 to AND circuit 244. During the second cycle of keyboard entry, AND circuit 244 is conditioned by a pulse applied to its second input and the information is passed from this AND circuit to accumulator 294 through OR circuit 246, OR circuit 276, inverter 284, OR circuit 280, inverter 288, AND circuit 290 and then through OR circuit 292 directly to turn the accumulator trigger "on" if it was previously "off" in response to a "1" or through inverter 296 to turn the accumulator trigger "off" if it was previously "on," in response to a "0." In this event, AND circuit 290 receives a conditioning potential from carry trigger 282 since the output terminal of this trigger to which the input of this AND circuit is connected, is positive in the initial "off" condition of the carry trigger. The new information applied to the accumulator is written on the magnetic drum 248 by write head 250.

For initiating the procedure for translating a demical number so entered in accordance with this invention, the information written on the magnetic drum is read by head 252. The pulses produced by the reading of a "1" by head 252 are effective to turn storage trigger 254 on and in the absence of a "1," or in other words in reading "0," the sample pulse applied to the trigger is effective to turn the trigger "off."

During the first cycle of keyboard entry, AND circuit 256 is conditioned to pass information received from the storage trigger unit. The information is then applied to accumulator trigger 294 in the manner hereinabove described. Also, the information from storage trigger 254 is applied to inverter 262 and delay trigger 264. A "1" turns this trigger "on" if it was "off" and a "0" turns it "off" if it was "on." The switching action of the trigger from an "off" condition to an "on" condition or vice versa requires a period of time greater than the time duration of the sample pulse whereby the trigger 266 is not affected by the newly added information into trigger 264 until a bit time later. Similarly, trigger 266 delays the information received from circuit 264 one bit time. During the first cycle of keyboard entry, AND circuit 270 is conditioned for transfer of the information in trigger 266 to the accumulator trigger through OR circuit 272 and the other circuitry in the manner described hereinabove. Thus, it is seen that during the first cycle of keyboard entry the numeric information is delayed two bit times and added to itself as before to effectively multiply the binary number by 5 and applied to the circulating register.

During the second cycle of keyboard entry, the information in the circulating register is delayed one bit time and the newly entered information is added before it is again written into the circulating register. During this second cycle, AND circuit 270 is closed but AND circuit 268 is opened and the information is passed to the accumulator after a single bit time delay. Also, AND circuit 244 is conditioned during the second cycle of keyboard entry and the newly added information is applied from the keyboard to the accumulator as hereinabove described.

From the foregoing description it is seen that a novel method and apparatus are provided for translating decimal numbers, serially presented, high order digit first, to binary numbers.

The foregoing and other objects, features and advantages of the invention will be apparent from the following more particular description of prefered embodiments of the invention, as illustrated in the accompanying drawings.

What is claimed is:

1. A system for translating a decimal number to binary form comprising a binary adder and clock means for producing potential pulses in predetermined bit time intervals, means for translating in progressively descending order the individual digits of a decimal number into their binary equivalents and means for applying said binary equivalent numbers to said adder, a binary storage register and means for applying the numeric information entered into said adder to said storage register, means for circulating the information in said storage register directly through said adder and means timed by said clock means for circulating the numeric information in said storage register through a pair of circuits and said adder, each of said circuits interposing a one bit time delay to said numeric information to effectively multiply the binary equivalent of each decimal digit by four, said adder being effective to add the binary equivalent number to the number multiplied by four to produce a sum equal to five times said binary equivalent number, means for circulating said sum through one of said circuits to effectively multiply said sum by two and adding the same to the binary equivalent of a next lower order digit of said decimal number whereby successive effective multiplications of the number stored in the register by five and two and addition of the binary equivalent to the next lower order digit is effective to translate, serially by digit, a decimal number to its binary equivalent.

2. A system for translating a decimal number to its binary equivalent comprising a binary adder and a binary storage register, means for entering numeric information from said adder into said storage register, circuit means for circulating the numeric information in said storage register through said adder and back to said storage register, said circuit means including a pair of delay units for delaying the numeric information two bit times, to effectively multiply said number by four, means for adding said product to said number and entering the sum thereof to said binary register, means for circulating said sum through one of said circuits, and said adder to effectively multiply the same by two to yield a second product and means for adding the binary equivalent to the next lower order digit of said decimal number to said second product whereby a decimal number having a plurality of digits may be translated to binary form by successive effective multiplications of the binary equivalent of each decimal digit and addition of the final product thereof to the binary equivalent of the next lower order decimal digit.

3. A system for translating a decimal number to binary form comprising a keyboard unit effective to translate the individual digits of a decimal number to their binary equivalents, a binary adder circuit, a binary storage register, clock means for producing potential pulses in predetermined bit time intervals and a pair of delay triggers effective under control of said clock means to transmit numeric information while interposing a one bit time delay, gate circuit means effective during a predetermined time interval to couple the output of said binary storage register to said adder both directly and through said delay triggers in cascade with each other, for effectively obtaining the sum of a binary number from the storage register and the product of four times the number, and gate means effective during another predetermined time interval for coupling the output of said binary register to said adder through a single one of said delay triggers for effectively multiplying said sum by two and simultaneously coupling the output of said keyboard unit to said adder to add the binary equivalent of the next lower order digit of the decimal number to the product of said sum and the number two.

4. A system for translating a decimal number to equivalent binary form comprising a keyboard entry unit effective to translate a decimal digit to its binary equivalent, an adder circuit and gate circuit means being responsive to gating potentials to transmit the information from said keyboard unit to said adder, a binary storage register coupled to the output of said adder circuit, means for entering information into said binary storage register in progressively higher binary orders in response to successive bit time pulses, a pair of delay trigger circuits each being responsive to potential pulses at successive bit times to transmit numeric information entered into the input thereof to the output thereof but delayed one bit time interval, gate circuit means responsive to potential pulses for selectively connecting said trigger circuits in cascade between said storage register and adder circuit during one predetermined time interval, and simultaneously connecting said binary storage register directly to said adder, further gate means responsive to potentials to connect one of said trigger circuits between said binary storage register and said adder circuit during another predetermined time interval and for simultaneously coupling said keyboard unit to said adder for entering numeric information thereto.

5. A circuit apparatus for translating a multi-digit decimal number to its binary equivalent, comprising a storage register having an input and an output, an adder having a pair of inputs and an output, means for translating decimal digits to their binary equivalents and for representing the binary digits of each decimal digit translation by electrical potentials in a series of equally spaced time intervals, means including first gating means for applying the series of potentials representing binary digits to one input of said adder, and means coupling the output of said adder to the input of said storage register, a pair of delay circuits each having an input and an output and being effective to interpose a delay of one of said time intervals to pulses applied to its input, means coupling the output of one of said delay circuits to the input of the other delay circuit, means coupling the output of said storage register to the input of one of said delay circuits, second and third gating means for coupling the respective outputs of said delay circuits to the other input of said adder, fourth gating means for coupling the output of said storage register to the one input of said adder and means for controlling said first gating means for entering the binary equivalents of decimal digits to said storage trigger through said adder, means during a first cycle of translation for controlling said second and fourth gating circuits for circulating a binary number stored in said storage register through said delay circuits to effectively multiply the same by four and for adding the product so produced to the number itself to produce a sum five times as great as said number, and means during a second cycle of translation for controlling said first and third gating circuits for circulating said sum number through said one delay circuit to multiply the same by two and for adding the binary equivalent of the next lower order decimal digit whereby a succession of first and second cycles of operation is effective to translate a multi-digit decimal number to its binary equivalent and store the same in said storage register.

References Cited by the Examiner

UNITED STATES PATENTS

| | | | |
|---|---|---|---|
| 2,856,126 | 10/58 | Kilburn | 235—164 |
| 2,864,557 | 12/58 | Hobbs | 235—155 |

OTHER REFERENCES

Mauchly: "Theory and Techniques for Design of Electronic Digital Computers," University of Pennsylvania, June 30, 1948, 235–155 (Lecture 25 by Dr. John W. Mauchly, Electronic Control Company, entitled "Conversion Between Binary and Decimal Number System") (8 pages).

MALCOLM A. MORRISON, *Primary Examiner.*

WALTER W. BURNS, *Examiner.*